United States Patent
Marupaduga

(10) Patent No.: US 11,540,232 B1
(45) Date of Patent: Dec. 27, 2022

(54) SPR AS A CRITERION TO DETERMINE THE FREQUENCIES THAT WOULD BE ALLOCATED FOR INTER-BAND CARRIER AGGREGATION, INTRA-BAND CARRIER AGGREGATION, OR DYNAMIC SPECTRUM SHARING

(71) Applicant: T-MOBILE INNOVATIONS LLC, Overland Park, KS (US)

(72) Inventor: Sreekar Marupaduga, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 63 days.

(21) Appl. No.: 17/036,570

(22) Filed: Sep. 29, 2020

(51) Int. Cl.
*H04W 72/04* (2009.01)
*H04W 72/06* (2009.01)
*H04W 52/24* (2009.01)

(52) U.S. Cl.
CPC ..... *H04W 52/244* (2013.01); *H04W 72/0453* (2013.01); *H04W 72/06* (2013.01)

(58) Field of Classification Search
None
See application file for complete search history.

(56) References Cited

U.S. PATENT DOCUMENTS

| | | | |
|---|---|---|---|
| 10,129,762 B1* | 11/2018 | Marupaduga | H04B 17/336 |
| 10,129,889 B1* | 11/2018 | Marupaduga | H04W 72/0453 |
| 10,314,055 B1* | 6/2019 | Marupaduga | H04W 36/30 |
| 10,321,334 B1* | 6/2019 | Marupaduga | H04W 16/30 |
| 2018/0070250 A1* | 3/2018 | Venkataraman | H04W 48/08 |
| 2020/0083971 A1* | 3/2020 | Zhong | H04B 7/0617 |
| 2020/0244292 A1* | 7/2020 | Park | H04B 1/0458 |
| 2021/0243780 A1* | 8/2021 | Han | H04W 72/0446 |
| 2022/0173504 A1* | 6/2022 | Meyer | H01Q 3/06 |

FOREIGN PATENT DOCUMENTS

CN 110994200 A * 4/2020

* cited by examiner

*Primary Examiner* — The Hy Nguyen

(57) ABSTRACT

Methods and systems are provided for determining frequency allocation. A first frequency band, a second frequency, and a third frequency band are ranked based at least in part on a sector power ratio (SPR). The first frequency band is determined to have a highest rank, which indicates that the first frequency band has a lowest SPR of frequency bands being ranked. Based on the first frequency band having the highest rank, the first frequency band and either the second frequency band or the third frequency band are assigned for carrier aggregation.

20 Claims, 7 Drawing Sheets

SPR AS A CRITERION TO DETERMINE THE FREQUENCIES THAT WOULD BE ALLOCATED FOR INTER-BAND CARRIER AGGREGATION, INTRA-BAND CARRIER AGGREGATION, OR DYNAMIC SPECTRUM SHARING

SUMMARY

The present disclosure is directed, in part, using antenna sector power ratio (SPR) as a criterion to determine frequencies allocated for inter-band carrier aggregation, intra-band carrier aggregation, or dynamic spectrum sharing, substantially as shown in and/or described in connection with at least one of the figures, and as set forth more completely in the claims.

In brief and at a high level, this disclosure describes, among other things, methods and systems for determining frequencies using SPR. A first frequency band, a second frequency, and a third frequency band are ranked based at least in part on the SPR. Additionally, the first frequency band is determined to have a highest rank, which indicates that the first frequency band has a lowest SPR of frequency bands being ranked. Based on the first frequency band having the highest rank, the first frequency band and either the second frequency band or the third frequency band are assigned for carrier aggregation.

In some embodiments, a plurality of frequency bands are ranked based at least in part on SPR. A first frequency band of the plurality of frequency bands is determined to have a lower rank than a second frequency band, the lower rank indicating that the first frequency band has a higher SPR than the second frequency band. Based at least in part on the lower rank, the second frequency band and a third frequency band of the plurality of frequency bands are assigned for carrier aggregation.

In some embodiments, it is determined a first frequency band supports a first wireless communication protocol and a second frequency band supports a second wireless communication protocol. A first SPR value for the first frequency band is determined to be higher than a second SPR value for the second frequency band. Based at least in part on the first SPR value being higher for the first frequency band than the second frequency band, the second frequency band is assigned to the first wireless communication protocol.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present technology is described in detail below with reference to the attached drawing figures, wherein.

DETAILED DESCRIPTION

Figure 1:
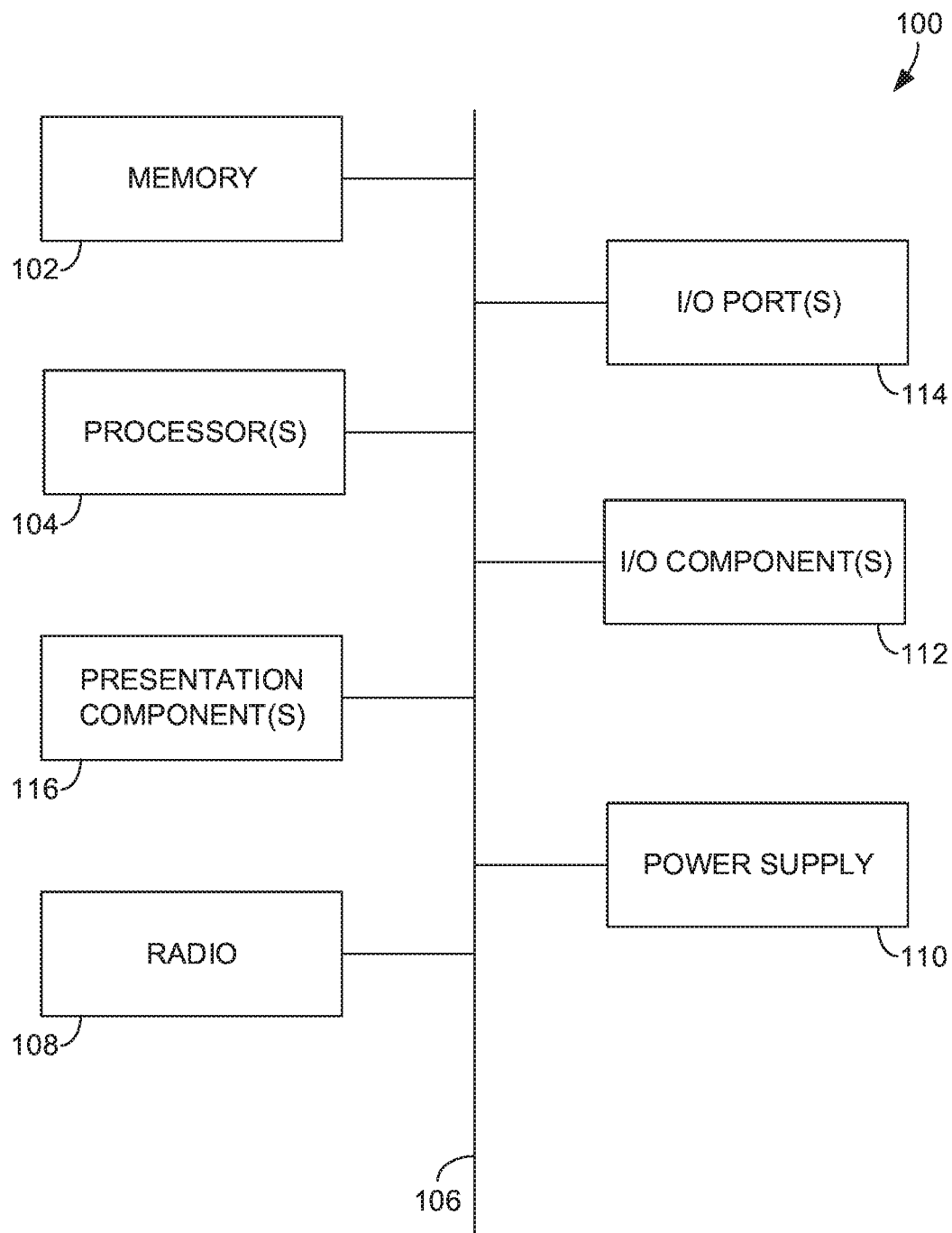
FIG. 1 depicts a diagram of an exemplary computing environment suitable for use in implementations of the present disclosure.

The subject matter of embodiments of the present disclosure is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| 5G | Fifth-Generation Cellular Communication System |
| CD-ROM | Compact Disk Read Only Memory |
| CDMA | Code Division Multiple Access |
| eNodeB | Evolved Node B |
| gNodeB | Next Generation Node B |
| GPRS | General Packet Radio Services |
| GSM | Global System for Mobile communications |
| DVD | Digital Versatile Discs |
| EEPROM | Electrically Erasable Programmable Read Only Memory |
| EN-DC | EUTRA-NR Dual Connectivity |
| GPS | Global Positioning System |
| HSDPA | High Speed Downlink Packet Access |
| LTE | Long Term Evolution |
| MIMO | Multiple Input Multiple Output |
| MU-MIMO | Multiple User Multiple Input Multiple Output |
| PC | Personal Computer |
| PDA | Personal Digital Assistant |
| RAM | Random Access Memory |
| RF | Radio-Frequency |
| ROM | Read Only Memory |
| RRC | Radio Resource Control |
| RSRP | Reference Signal Receive Strength |
| RSRQ | Reference Signal Receive Quality |
| SINR | Transmission-to-Interference-Plus-Noise Ratio |
| SMS | Short Message Service |
| SPR | Sector Power Ratio |
| TDMA | Time-Division Multiple Access |
| UE | User Equipment |
| UMTS | Universal Mobile Telecommunications Systems |
| VoIP | Voice over Internet Protocol |
| WCDMA | Wideband Code Division Multiple Access |
| WiMAX | Worldwide Interoperability for Microwave Access |

Further, various technical terms are used throughout this description. An illustrative resource that fleshes out various aspects of these terms can be found in Newton's Telecom Dictionary, 31st Edition (2018).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, DVD, holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions, including data structures and program modules, in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, wireless telecommunication networks provide access for a user device (e.g., a UE) to access one or more network services. In some cases, the desired network service may be a telecommunication service. In conventional systems, SPR is not considered a factor for either carrier aggregation or dynamic spectrum sharing. Conventional systems typically aggregate carriers based on loading capacity or a number of users accessing the corresponding frequency. Unlike conventional systems, the present disclosure considers additional criteria not considered conventionally and allows for the combination of carriers to provide a higher bandwidth and dynamic spectrum sharing for the enhancement of communications between UEs and telecommunication services.

For example, one aspect of the present disclosure provides for a system for determining frequency allocation. A first frequency band, a second frequency, and a third frequency band are ranked based at least in part on the SPR. The first frequency band is determined to have a highest rank, which indicates that the first frequency band has a lowest SPR of frequency bands being ranked. Based on the first frequency band having the highest rank, the first frequency band and either the second frequency band or the third frequency band are assigned for carrier aggregation.

Another aspect of the present disclosure is directed to a method for determining frequency allocation. A plurality of frequency bands are ranked based at least in part on SPR. A first frequency band of the plurality of frequency bands is determined to have a lower rank than a second frequency band, the lower rank indicating that the first frequency band has a higher SPR than the second frequency band. Based at least in part on the lower rank, the second frequency band and a third frequency band of the plurality of frequency bands are assigned for carrier aggregation.

In another aspect, methods are provided for using antenna SPR to determine dynamic spectrum sharing. It is determined that a first frequency band supports a first wireless communication protocol and a second frequency band supports a second wireless communication protocol. A first SPR value for the first frequency band is determined to be higher than a second SPR value for the second frequency band. Based at least in part on the first SPR value being higher for the first frequency band than the second frequency band, the second frequency band is assigned to the first wireless communication protocol.

Turning to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 106 that directly or indirectly couples the following devices: memory 102, processor(s) 104, radio(s) 108, power supply 110, input/output (I/O) component(s) 112, I/O port(s) 114, and presentation component(s) 116. Bus 106 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O component(s) 112. Also, processors, such as the processor(s) 104, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Additionally, computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 102 includes computer-storage media in the form of volatile and/or nonvolatile memory. Memory 102 may be removable, nonremovable, or a combination thereof. Exemplary memory includes solid-state memory, hard drives, optical-disc drives, etc. Computing device 100 includes processor(s) 104 that read data from various entities such as bus 106, memory 102 or I/O component(s) 112. Presentation component(s) 116 presents data indications to a person or other device. Exemplary presentation component(s) 116 include a display device, speaker, printing component, vibrating component, etc. I/O port(s) 114 allow computing device 100 to be logically coupled to other devices including I/O component(s) 112, some of which may be built in computing device 100. Illustrative I/O component(s) 112 include a microphone, joystick, game pad, satellite dish, scanner, printer, wireless device, etc.

Radio(s) 108 represents a radio that facilitates communication with a wireless telecommunications network. In aspects, the radio(s) 108 utilizes one or more transmitters, receivers, and antennas to communicate with the wireless telecommunications network on a first downlink/uplink channel. Though only one radio is depicted in FIG. 1, it is expressly conceived that the computing device 100 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio(s) 108 might additionally or alternatively facilitate other types of wireless communications including Wi-Fi, WiMAX, LTE, or other VoIP communications. As can be appreciated, in various embodiments, radio(s) 108 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
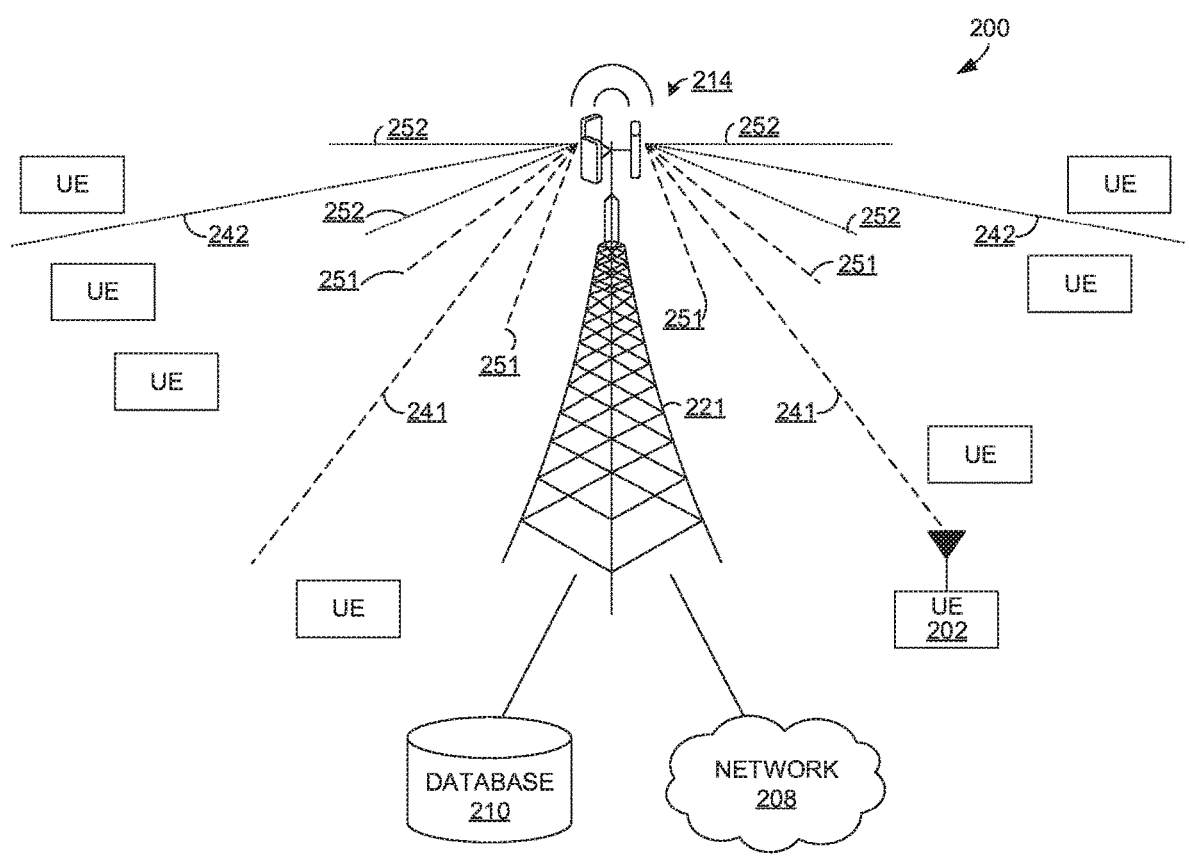
FIG. 2 illustrates a wireless communication system in which implementations of the present disclosure may be employed.

Turning now to FIG. 2, wireless communication system 200 is an exemplary environment in which implementations of the present disclosure may be employed. Wireless communication system 200 is one example of a suitable environment and is not intended to suggest any limitation as to the scope of use or functionality of the present disclosure. Neither should the environment be interpreted as having any dependency or requirement relating to any one or combination of components illustrated.

Wireless communication system 200 includes UE 202 (wireless communication system 200 contains additional UEs that are not numbered for clarity), network 208, database 210, cell site 214 that broadcasts wireless signals over frequency bands 241 and 242 (wireless communication system 200 may contain additional frequency bands that are not depicted for clarity), and base station 221. Frequency bands 241 and 242 may include radiation 251 and 252. The additional UEs may already be in communication with the frequency bands 241 and 242, which affects loading on base station 221. In operation, base station 221 may determine network loads on frequency bands 241 and 242. For example, base station 221 may use vertical beamforming or base station tilt to minimize interference caused by the upper sidelobes from radiation 251 or 251. In some embodiments, frequency band 241 may have less upper sidelobe interference than frequency band 242. Examples of wireless base station 221 include wireless access points, base transceiver stations, LTE, and eNodeB.

In operation, wireless communication system 200 may use a plurality of carriers to provide wireless communication services. For example, a plurality of carriers that comprise bandwidth for wireless communications (e.g., one or more carriers over a 1.25 GHz spectrum, one or more carriers over a 1900 MHz spectrum, one or more carriers over a 800 MHz spectrum, etc.) may include a plurality of channels (e.g., 5 MHz channels, 10 MHz channels, 15 MHz channels, etc.) that may further be divided into subcarriers. In some aspects, frequency band 241 may comprise a carrier, a channel, a subcarrier, or a plurality of any of these. In some aspects, frequency band 241 has the same carrier as frequency band 242. In some aspects, frequency band 241 has a different subcarrier than frequency band 242. In some aspects, frequency band 241 has a common channel as frequency band 242.

In the wireless communication system 200, UE 202 may take on a variety of forms, such as a PC, a user device, a smart phone, a smart watch, a laptop computer, a mobile phone, a mobile device, a tablet computer, a wearable computer, a PDA, a server, a CD player, an MP3 player, a GPS device, a video player, a handheld communications device, a workstation, a router, an access point, and any combination of these delineated devices, or any other device that communicates via wireless communications with the cell site 214 in order to interact with network 208, which may be a public or a private network.

In some aspects, the UE 202 corresponds to a user device or a computing device. For example, the user device may include a display(s), a power source(s) (e.g., a battery), a data store(s), a speaker(s), memory, a buffer(s), a radio(s) and the like. In some implementations, the UE 202 comprises a wireless or mobile device with which a wireless telecommunication network(s) may be utilized for communication (e.g., voice and/or data communication). In this regard, the user device may be any mobile computing device that communicates by way of a wireless network, for example, a 3G, 4G, 5G, LTE, CDMA, or any other type of network.

In some cases, the UE 202 in wireless communication system 200 may optionally utilize network 208 to communicate with other computing devices (e.g., a mobile device (s), a server(s), a personal computer(s), etc.) through cell site 214. The network 208 may be a telecommunications network(s), or a portion thereof. A telecommunications network might include an array of devices or components (e.g., one or more base stations), some of which are not shown. Components such as terminals, links, and nodes (as well as other components) may provide connectivity in various implementations. Network 208 may include multiple networks, as well as being a network of networks, but is shown in more simple form so as to not obscure other aspects of the present disclosure.

Network 208 may be part of a telecommunication network that connects subscribers to their service provider. In aspects, the service provider may be a telecommunications service provider, an internet service provider, or any other similar service provider that provides at least one of voice telecommunications and data services to UE 202 and any other UEs. For example, network 208 may be associated with a telecommunications provider that provides services (e.g., LTE) to the UE 202. Additionally or alternatively, network 208 may provide voice, SMS, and/or data services to user devices or corresponding users that are registered or subscribed to utilize the services provided by a telecommunications provider. Network 208 may comprise any communication network providing voice, SMS, and/or data service(s), using any one or more wireless communication protocols, such as a 1× circuit voice, a 3G network (e.g., CDMA, CDMA2000, WCDMA, GSM, UMTS), a 4G network (WiMAX, LTE, HSDPA), or a 5G network. The network 208 may also be, in whole or in part, or have characteristics of, a self-optimizing network.

In some implementations, cell site 214 is configured to communicate with the UE 202 that is located within the geographical area defined by a transmission range and/or receiving range of the radio antennas of cell site 214. The geographical area may be referred to as the coverage area of the cell site. Cell site 214 may include one or more base stations, base transmitter stations, radios, antennas, antenna arrays, power amplifiers, transmitters/receivers, digital signal processors, control electronics, GPS equipment, and the like. In particular, cell site 214 may be configured to wirelessly communicate with devices within a defined and limited geographical area. In some embodiments, it may be undesirable and unintended by the network 208 that the cell site 214 provide wireless connectivity to the UE 202 when the UE 202 is geographically situated outside of the cell associated with cell site 214.

In an exemplary aspect, the cell site 214 comprises base station 221 that serves at least one sector of the cell associated with the cell site 214, and at least one transmit antenna for propagating a signal from the base station 221 to one or more of the UE 202. In other aspects, the cell site 214 may comprise multiple base stations and/or multiple transmit antennas for each of the one or more base stations, any one or more of which may serve at least a portion of the cell. In some aspects, the cell site 214 may comprise one or more macro cells (providing wireless coverage for users within a large geographic area) or it may be a small cell (providing wireless coverage for users within a small geographic area). For example, macro cells may correspond to a coverage area having a radius of approximately 1-15 miles or more, the radius measured at ground level and extending outward from an antenna at the cell site. In another example, a small cell may correspond to a coverage area having a radius of approximately less than three miles, the radius measured at ground level and extending outward from an antenna at the cell site.

As mentioned above, the wireless base station 221 may determine the interference levels on frequency bands 241 and 242. Some or all of the UEs communicating with frequency band 241 or 242 may be capable of using carrier aggregation for exchanging data with wireless base station 221. Wireless base station 221 may determine the amount of carrier aggregation usage on frequency bands 241 and 242. For example, RF measurements may be taken periodically to determine network load, interference, USLS levels, carrier aggregation usage, etc. Additionally, RF measurements may be taken in response to an event, such as when a UE attaches or when a UE is initiating a handoff from one base station to another.

In some embodiments, wireless base station 221 receives a request from UE 202 for attachment. For example, UE 202 may transfer an RRC connection request. When a network load on frequency band 241 exceeds a corresponding network threshold, then wireless base station 221 selects a different frequency band having a network load at or below the threshold and attaches UE 202 to the different frequency band (frequency band 242 or another frequency band not depicted). In some examples, selecting a frequency band for attachment of UE 202 is triggered when the network load across all frequency bands is similar and interference levels on one or more of the frequency bands is above a threshold. In other examples, selecting a frequency band for UE 202 attachment may be triggered when the number of UEs using carrier aggregation exceeds a threshold.

Figure 3:
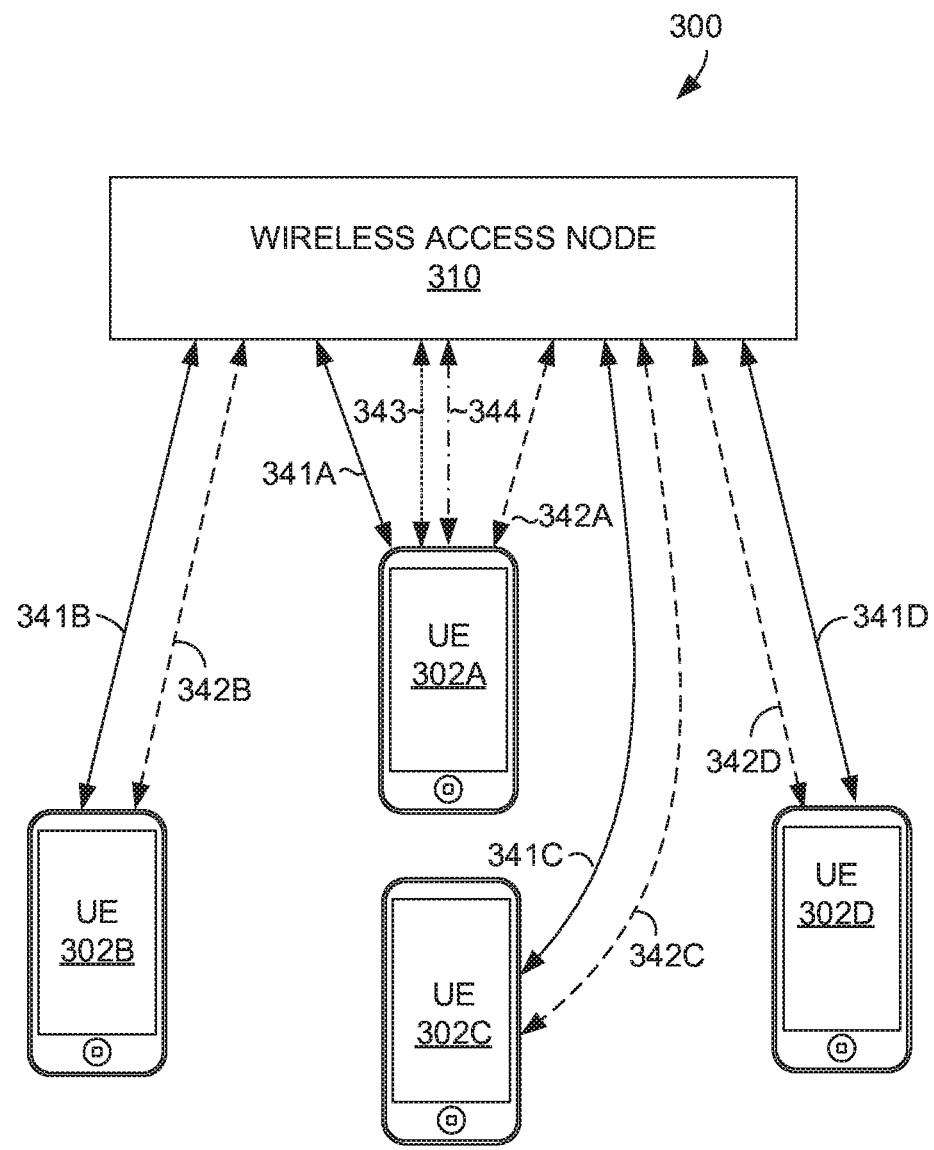
FIG. 3 depicts an exemplary wireless communication environment comprising wireless access nodes in communication with user equipment.

Turning now to FIG. 3, wireless communication environment 300 comprises at least a portion of a wireless access network. The wireless communication environment 300 includes multiple UEs 302A, 302B, 302C, and 302D and a wireless access node 310. The wireless access node 310 is connected, wired or wirelessly, to other components and portions of the wireless access network. The wireless access node 310 may be in communication with one or more of the UEs 302A, 302B, 302C, and 302D. In embodiments, the wireless access node 310 has allocated a first frequency band 341A, 341B, 341C, and 341D to each UE 302A, 302B, 302C, and 302D. Additionally, a second frequency band 342A, 342B, 342C, and 342D was allocated to UEs 302A, 302B, 302C, and 302D. In some embodiments, a third frequency band 343 and a fourth frequency band 344 may be allocated to UE 302A. The wireless communication environment 300 may perform carrier aggregation with at least some of the UEs that are operating within the region of the wireless access node 310. The wireless communication environment 300 may operate according to any suitable wireless communication protocol, including LTE or 5G, for example.

In some embodiments, the wireless access node 310 may allocate a signaling channel and multiple traffic channels to a UE. For example, carrier aggregation may occur when a UE is allocated more than one traffic channel. Carrier aggregation provides a higher traffic rate between the wireless access node 310 and the corresponding UE. Carrier aggregation may be used in various wireless communication protocols (e.g. LTE, LTE Advanced-PRO, and 5G NR) to increase bandwidth and bitrate. Carrier aggregation may also be used for both Frequency Division Duplex and Time Division Duplex systems. A component carrier may comprise aggregated frequency bands, and individual component carriers may have different bandwidths. Each component carrier may comprise one serving cell, and different serving cells may have different coverages (different cell sizes).

Access node 310 may communicate in various ways. For example, access node 310 may communicate with wireless devices over multiple frequency bands using carrier aggregation such that the data rate (or throughput) for the communication is greater than the data rate for single carrier communication. In an embodiment, access node 310 may communicate with a UE using a primary carrier (e.g., a first frequency band) and one or more secondary carriers (e.g., one or more secondary frequency bands). For example, a primary channel (e.g., 5 or 10 MHz channel) and one or more secondary channels may be allocated for communication between access node 310 and a UE, wherein each channel may comprise a component carrier for the communication. When using carrier aggregation, the available spectrum for communication, and thus the data rate or throughput, may increase directly with the number of secondary component carriers. In this way, carrier aggregation may allow for communication networks to use multiple resource blocks simultaneously for a UE. In addition, carrier aggregation configurations for UEs may include a primary component carrier to exchange control and signaling data and one or more secondary component carriers to exchange additional user data between the UE and the base station.

Access node 310 communication may leverage one or more of intra-band carrier aggregation with contiguous component carriers, intra-band carrier aggregation with non-contiguous component carriers, or inter-band carrier aggregation. Intra-band contiguous carrier aggregation uses component carriers that are in the same frequency band and are adjacent to each other. Intra-band non-contiguous carrier aggregation uses component carriers that are in the same frequency band but are not adjacent to each other (component carriers having the same operating frequency bands but with gaps in between). Inter-band carrier aggregation may use component carriers that are in different frequency bands. Inter-band carrier aggregation may involve component carriers that will experience different pathloss, which increases with increasing frequency.

Turning to the first frequency band 341A-341D and additional frequency bands, the various frequency bands may be assigned for carrier aggregation based on their SPR rankings. Higher rankings, for example, include frequency bands with lower SPR values than the other frequency bands. An SPR is a measure of the ability of an antenna of a cell site to minimize interference. SPR describes a RF power that is radiated outside of an antenna array's sector relative to a RF power that is radiated and retained within the antenna array's sector. Because SPR is a ratio, SPR may be represented using a percentage value or numerical value. An example of a low SPR value is 3-4% and an example of a high SPR value is 8-10%. Antennas with greater spillover areas have greater SPR values. SPR information may be used for dynamically combatting interference and noise at the wireless access node 310. Additionally, the SPR values of cell site antennas may be used for selection and assignment of specific frequency bands to component carriers of UEs in a telecommunications environment.

Increased or high SPR values have negative impacts, which are exacerbated in wireless communication protocol environments that allow and facilitate multiple frequency bands and carrier aggregation for combining two or more frequency bands for uplink and/or downlink communications. Negative impacts that high-powered, undesired RF radiation at a cell site causes may be reduced or mitigated by assigning two or more frequency bands of lower ranked SPRs than at least one other frequency band for carrier aggregation. For example, two frequency bands that correspond to lower ranked SPRs may be assigned for carrier aggregation to a primary component carrier of an inter-band carrier aggregation capable device that is geographically located at or near radio frequency "spillover" areas (i.e., radiation outside of an antenna's desired sector at a cell site) and which is experiencing lower throughput.

In some aspects of FIG. 3, for example, the first frequency band 341A-341D has the same carrier as the second frequency band 342A-342D. In some aspects, the first frequency band 341A-341D has a different carrier than the second frequency band 342A-342D. In some aspects, the first frequency band 341A-341D has a different subcarrier than the second frequency band 342A-342D. In some aspects, the first frequency band 341A-341D has a common subcarrier as the second frequency band 342A-342D. In some aspects, the first frequency band 341A-341D has a common channel as the second frequency band 342A-342D. Accordingly, assigning the first frequency band 341A-341D and the second frequency band 342A-342D for carrier aggregation allows for the aggregation of carriers over at least the first frequency band 341A-341D and the second frequency band 342A-342D using intra-band contiguous carrier aggregation, intra-band non-contiguous carrier aggregation, or inter-band carrier aggregation.

In some aspects of FIG. 3, for example, ranking the SPR of a corresponding frequency may include determinations of RF radiation (e.g. RF radiation patterns). As noted above, SPR quantifies the power of RF radiation that is outside of the sector of an antenna relative to the power of the RF radiation radiated within the same sector of the same antenna. As such, the SPR represents the power of the undesired RF signal relative to the power of the desired RF signal for a particular antenna. As undesired RF spillover of an antenna increases, the SPR of the same antenna increases, when all other factors are controlled. In this situation, as the SPR of the antenna increases, rankings of corresponding frequencies decrease when the other frequency SPR values remain lower than the frequencies with increased SPR due to spillover. As undesired RF spillover and SPR increase, interference and noise increase at the wireless access node 310. Frequency SPR rankings may indicate an antenna's likelihood of causing interference and noise, or actual causation of interference and noise.

In some aspects of FIG. 3, for example, ranking the SPR of a corresponding frequency may include determinations of materials of antennas, sector orientation, electrical and mechanical tilt, carrier bands associated with antennas, technical operating specifications of an antenna, environmental conditions, and power supplied to an antenna, etc. SPR may be affected by orientation (i.e., how the service coverage area has been partitioned into sectors), electrical tilt, mechanical tilt, carrier band associated with an antenna, technical operating specifications of an antenna, manufacturing and materials of an antenna, environmental conditions (i.e., weather, heat, wear and tear), and power supplied to an antenna, for example. Carrier bands may refer to spectrums in any of the low band (e.g., Band 71/600 MHz, 700 MHz), the mid band (e.g., PCS, AWS1/2/3/4), and the high band (e.g., WCS/2.3 GHz, EBS/BRS 2.5 GHz, 24 GHz, 29 GHz, 29 GHz, and 39 GHz spectrums, and 5G mobile network bands).

Because SPR values may be affected by orientation (i.e., how the service coverage area has been partitioned into sectors), electric tilt, mechanical tilt, specific frequencies of a carrier band associated with an antenna, technical operating specifications of an antenna, manufacturing and materials of an antenna, environmental conditions, and power supplied to an antenna, the base station may receive a particular SPR value of an antenna at the cell site when a UE enters a service coverage area. Alternatively, the base station may receive SPR values of the antennas at the cell site periodically, which may be stored in a database. Stored SPR values may be referenced when a UE enters a service coverage area. Additionally or alternatively, SPR values of the antennas at the cell site may be received for individual antennas at various times and periodically updated so that the performance of each antenna can be monitored, for example.

Due at least in part to these conditions, frequencies may be ranked when a UE enters a service coverage area, when a threshold number of UEs enter the service coverage area of the corresponding frequency being ranked, after a threshold period of time, or periodically. For example, if a detection or determination is made that a change in data relating to orientation, electric tilt, mechanical tilt, or environmental conditions, then all frequencies with a ranking may be re-ranked. In embodiments, if it is detected that an antenna corresponding to the fourth frequency band 344 experienced a change in electric tilt, the first frequency band 341A-341D, the second frequency band 342A-342D, the third frequency band 343, and the fourth frequency band 344 may all be re-ranked.

In some embodiments, frequency rankings are based on SPR and at least one of loading, a number of users, an amount of data in use, location information, and channel quality information. The loading and the number of users may comprise one or more of a current number of UEs associated with a particular wireless access node, a current number of UEs communicating with the particular wireless access node, a signaling load quantification, an interference quantification, or a noise quantification. Location information may comprise GPS or other satellite location services, terrestrial triangulation, an access point location, or any other means of obtaining coarse or fine location information. The location information may indicate geographic location (s) of one or more of a UE, an antenna, a wireless access node, a base station, a cell site, and/or a coverage area of a cell site, for example.

Channel quality information may indicate the quality of communications between one or more UEs and a particular cell site or wireless access node. For example, channel quality information may quantify how communications are traveling over a particular communication channel quality, thus indicating when communications performance is negatively impacted or impaired. As such, channel quality information may indicate a realized uplink and/or downlink transmission data rate of a cell site and/or each of one or more UEs communicating with the cell site, observed SINR and/or signal strength at the UE(s), or throughput of the connection between the cell site and the UE(s). Location and channel quality information may take into account the capability of the UE(s), such as the number of antennas communicating with a UE and the type of receiver used by the UE for detection.

In some embodiments, it may be determined that a UE is serviced by a frequency having an SPR above a threshold thereby disqualifying the frequency for carrier aggregation with another frequency. This threshold may be determined by analyzing a power supplied to a transmitting-receiving component of the cell site transmitting the frequency or by analyzing a network signal type emitted by the transmitting-receiving component. In some embodiments, the threshold may be determined by analyzing a network footprint via a measured performance of active state UEs in a coverage area. The network footprint may depend on a positioning of a particular transmitting-receiving component. Other factors contributing to the threshold determination may include the following: spillover at a particular area, RF radiation patterns, sector partitioning, electrical tilt, mechanical tilt, and carrier band associated with an antenna, etc.

In some embodiments, the first frequency band 341A-341D, the second frequency band 342A-342D, the third frequency band 343, and the fourth frequency band 344 may all be ranked based at least in part on SPR. It may be determined that the first frequency band 341A-341D has a highest rank and that the second frequency band 342A-342D has a second highest rank. Based on these rankings, the first frequency band 341A-341D and the second frequency band 342A-342D are assigned for carrier aggregation. In other embodiments (not depicted), it may be determined that the first frequency band 341A-341D has the highest rank and that the third frequency band 343 has the second highest rank, thereby causing for assignment for carrier aggregation the first frequency band 341A-341D and the third frequency band 343. In some embodiments (not depicted), it may be determined that the first frequency band 341A-341D has the highest rank, the second frequency band has the second highest rank, the third frequency band 343 has the third highest rank, and the fourth frequency band has the fourth highest rank; thereby causing for assignment for a first carrier aggregation the first frequency band 341A-341D and the third frequency band 343 and a second carrier aggregation comprising the second frequency band 342A-342D and the fourth frequency band 344. In some embodiments, a fifth frequency band (not depicted) may have a lower rank than the other four frequency bands and the other four may be assigned for carrier aggregation for UE 302A.

Figure 4:
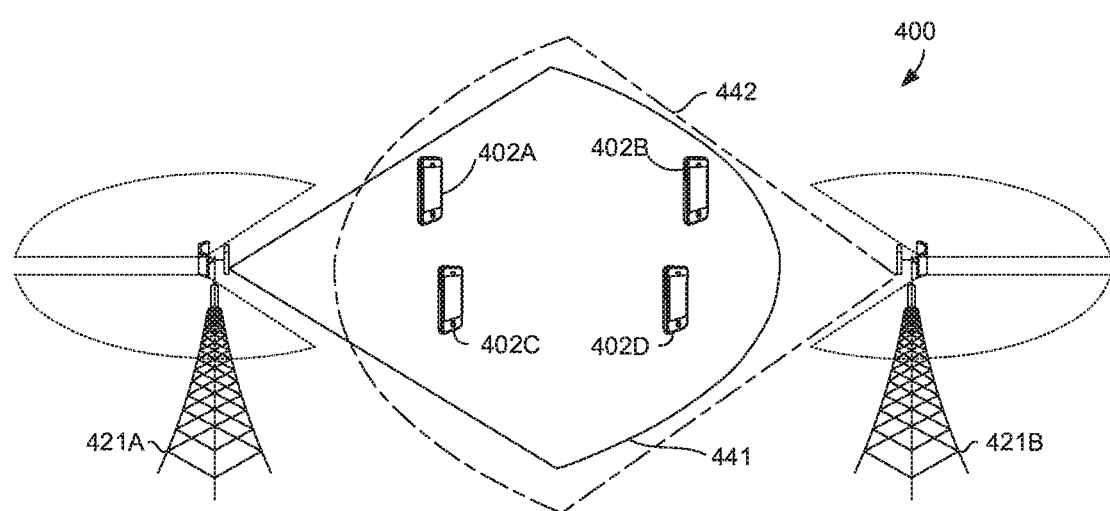
FIG. 4 depicts an operating environment, according to an embodiment of the present disclosure.

Turning now to FIG. 4, example operating environment 400 comprises a method, system, or media for using antenna SPR to determine dynamic spectrum sharing. Operating environment 400 comprises UEs 402A, 402B, 402C, and 402D; base stations 421A and 421B; and several frequency bands, including a first frequency band 441 and a second frequency band 442. UEs 402A, 402B, 402C, and 402D may each be within a service coverage area of the first frequency band 441 and the second frequency band 442. The first frequency band 441 and the second frequency band 442 may each comprise a radiation pattern of a corresponding antenna, which corresponds to base station 421A or 421B. The shape, size, and dimension(s) of the service coverage area of the first frequency band 441 and the second frequency band 442 may be determined by a specific radiation pattern of each corresponding antenna, as well as a direction, electrical tilt, mechanical tilt, installation height above the ground or surrounding geographic area, technical operating specifications, materials, obstructions (i.e., buildings, mountains, or other elevations), and power supplied to each of the antennas.

In some aspects, the first frequency band 441 supports a first wireless communication protocol and the second frequency band 442 supports a second wireless communication protocol. For example, both wireless communication protocols may support LTE but only one supports 5G. In some embodiments, UEs 402A, 402B, 402C, and 402D may detect a synchronization signal from base station 421A or 421B on at least one carrier and determine a carrier bandwidth, coverage strength (e.g. RSRP or RSRQ), and other operational parameters. Additionally, base station 421A or 421B may determine that one of UEs 402A-402D is not EN-DC capable and that the services of base station 421A or 421B may be limited to standalone 4G services.

Additionally, base station 421A or 421B may be a macro base station including a tower mounted antenna structure for providing a broad range of coverage, a small cell base station, femtocell base station, relay base station, or other type of smaller form factor with an antenna structure that provides a narrower range of coverage. Further, base stations 421A and 421B may share equipment. Further, in some aspects, base stations 421A and 421B may be operating using a Time Division Duplex and may alternate between transmitting periods and receiving periods. In some embodiments, base stations 421A may be a 5G base station and 421B may be a 4G base station. 4G services provided by the 4G base station on a 4G carrier may differ from a 5G service provided by the 5G base station. For example, one of base stations 421A or 421B may provide variable subcarrier spacing, but the other may provide fixed subcarrier spacing. As another example, one may have different symbol time segments than the other. In another example, one may make use of different MIMO technologies than the other. In yet another example, with Time Division Duplex carriers, one may have a flexible Time Division Duplex configuration and the other may have a fixed Time Division Duplex configuration.

Further, the first frequency band 441 is determined to have a first SPR value that is lower than a second SPR value of the second frequency band 442 (or that the second SPR value is higher than the first SPR value). Information from at least one of the UEs 402A-402D, base station 421A, or base station 421B may have been used in making the determination. For example, the antennas corresponding to base stations 421A and 421B may wirelessly receive and transmit RF transmissions to and from UEs 402A-402D, other cell sites, base stations, and/or satellites, to facilitate wireless communication protocols between such devices. These transmissions may be used at least in part to determine that the first SPR value is lower than the second SPR value of the second frequency band 442.

Further, based at least in part on determining the first SPR value is lower than the second SPR value, the first frequency band 441 may be assigned to the second wireless communication protocol. In some embodiments, the first wireless communication protocol is LTE and the second wireless communication protocol is 5G. In other embodiments, the second communication protocol is MU-MIMO and at least some of the UEs 402A-402D do not properly support MU-MIMO. Continuing the example, in addition to SPR values, a threshold number of UEs that properly support MU-MIMO may be used when determining the assignment of the first frequency band to the second communication protocol. In some embodiments, at least two of the UEs 402A-402D may have a similar set of component carriers and a different primary component carrier.

In some aspects, dynamically assigning the first frequency band to the second wireless communication protocol may mitigate the effects of tropospheric ducting on a radio signal. Tropospheric ducting may be caused by certain atmospheric conditions that in turn cause an increase of signal propagation. Signal propagation causes interference when signals are transmitted between base stations 421A and 421B in a neighboring market, leading to downgrading of radio communication links. Dynamically allocating the first frequency band to the second communication protocol may reduce this effect. For example, channels used by one or more antennas on the base station 421A may be adjusted so that the frequencies used for these antennas are different than the frequencies used for the base station 421B. In this way, propagated signals from the base station 421A will not be received by the base station 421B. Antennas at the base station 421B may also be adjusted to allocate different frequencies. In some embodiments, once the atmospheric conditions causing interference cease or reduce below a threshold (e.g. the SPR value of the second frequency band 442 is at or below a threshold), the antennas corresponding to base stations 421A and 421B may be readjusted to operate at their original frequencies (e.g. the second frequency band 442 may be reassigned to the second communication protocol).

Figure 5:
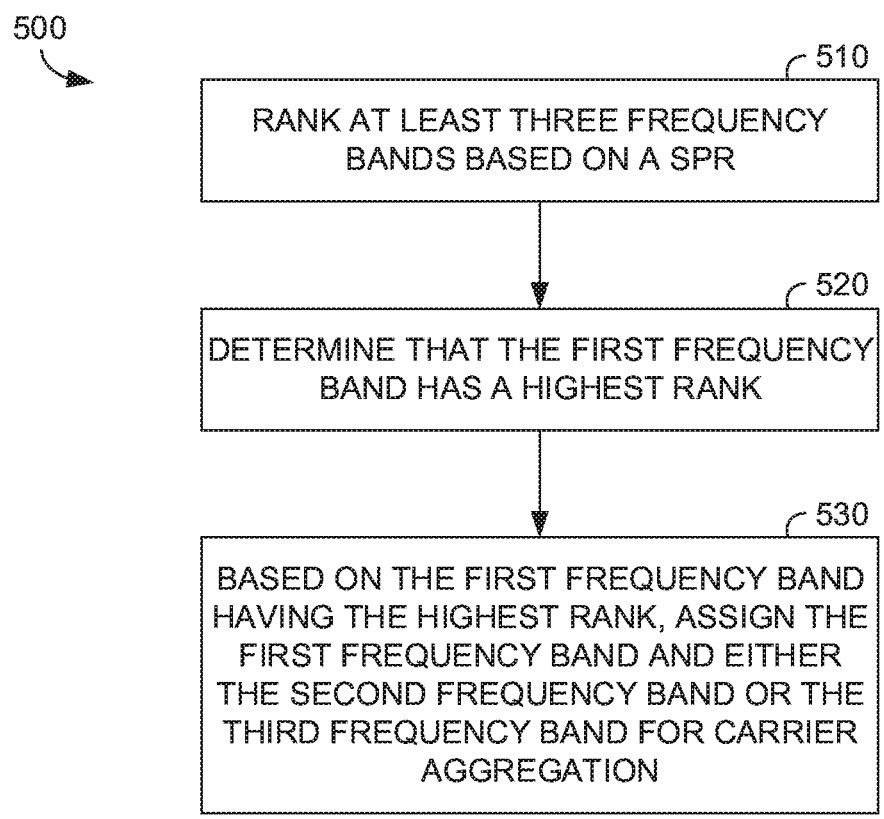
FIGS. 5-6 depict flow charts of systems, methods, and media for allocating inter-band carrier aggregation or intra-band carrier aggregation, in accordance with embodiments of the present disclosure.

Turning now to FIG. 5, example flow chart 500 involves a system comprising one or more nodes configured to wirelessly communicate with one or more user devices in a geographic service area and a processor configured to perform operations. For example, operations may comprise steps 510-530. At 510, at least a first frequency band, a second frequency, and a third frequency band may be ranked based at least in part on the SPR corresponding to each frequency. In some embodiments, more than three frequency bands are ranked. In some embodiments, multiple frequency bands are ranked from more than one cell site. In some embodiments, the ranking is additionally based on at least one of loading, a number of users, an amount of data in use, location information, and channel quality information. In some embodiments, ranking is additionally based on vertical beamforming, base station tilt, or a threshold interference caused by an upper sidelobe.

At 520, the first frequency band may be determined to have a highest rank, the highest rank indicating that the first frequency band has a lowest SPR of frequency bands being ranked. In some embodiments, the determination is based in part on a measure of undesired RF spillover of an antenna corresponding to the respective frequency band. In some embodiments, the determination is based in part on an antenna's likelihood of causing interference and noise. In some embodiments, the other frequencies not having the highest rank may have tied rankings. In some embodiments, there may be two or more frequencies that have a highest rank. In some embodiments, one of the ranked frequencies may be determined to have a lowest rank.

At 530, based at least in part on the first frequency band having the highest rank, the first frequency band and either the second frequency band or the third frequency band may be assigned for carrier aggregation. For example, if it is determined the second frequency band is ranked higher than the third frequency band, then the first frequency band and the second frequency band may be assigned for carrier aggregation. In some embodiments, more than two frequency bands are assigned for carrier aggregation. Further, carrier aggregation may involve intra-band carrier aggregation or inter-band carrier aggregation. For example, the first frequency band and the second frequency band may be at 1900 MHz and the third frequency band may be at 2500 MHz In this example, intra-band carrier aggregation occurs if the first frequency band and the second frequency band are assigned for carrier aggregation. Inter-band carrier aggregation occurs if the first frequency band and the third frequency band are assigned for carrier aggregation.

Figure 6:
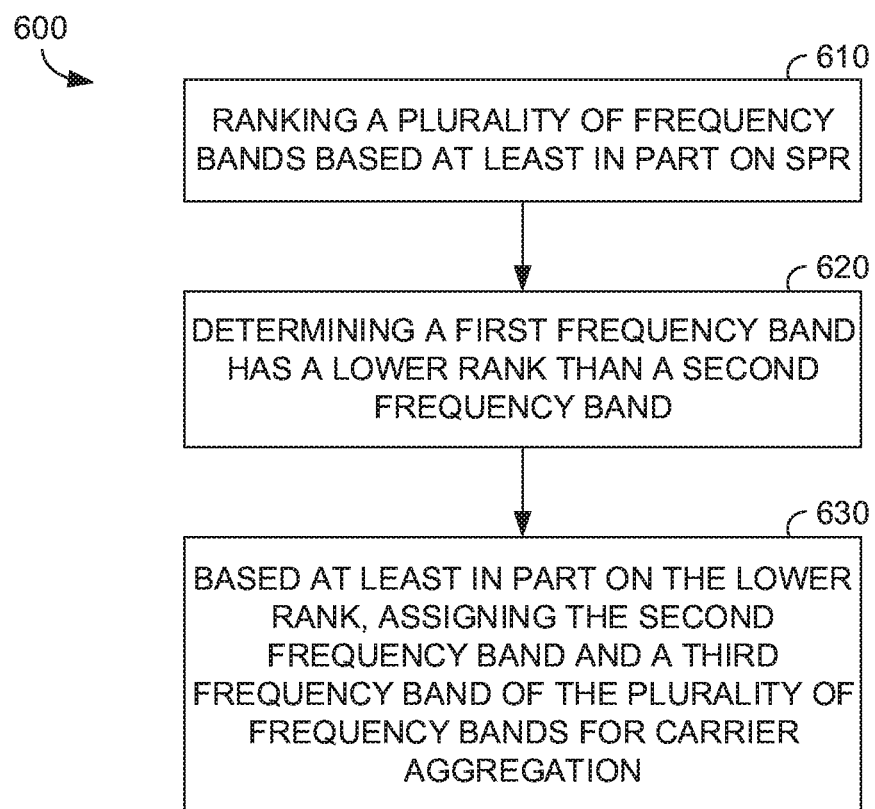

Turning now to FIG. 6, example flow chart 600 involves one or more non-transitory computer-readable media having computer-executable instructions embodied thereon that, when executed, perform a method for using antenna SPR to determine frequency allocation, the method comprising at least steps 610-630. At 610, a plurality of frequency bands are ranked based at least in part on SPR. In some embodiments, four or more frequencies may be ranked. For example, for LTE, five component carriers may be aggregated at maximum and for LTE Advanced-PRO, thirty two component carriers may be aggregated at maximum. At 620, a first frequency band of the plurality of frequency bands is determined to have a lower rank than a second frequency band, the lower rank indicating that the first frequency band has a higher SPR than the second frequency band. In some embodiments, the third frequency band is ranked higher than the first frequency band or equal to the second frequency band.

At 630, based at least in part on the lower rank, assigning the second frequency band and a third frequency band of the plurality of frequency bands for carrier aggregation. In some embodiments, the first frequency band is ranked higher than a fourth frequency band and a fifth frequency band, and the first frequency band, the second frequency band, and the third frequency band are then assigned for carrier aggregation. Continuing the example, the first frequency band, the second frequency band, and the third frequency band may have a common carrier or channel. In some embodiments, the first frequency band and the second frequency band have a different subcarrier. In some embodiments, the assignment for carrier aggregation of the first frequency band, the second frequency band, and the third frequency band is intra-band carrier aggregation with contiguous component carriers, intra-band carrier aggregation with non-contiguous component carriers, or inter-band carrier aggregation.

Figure 7:
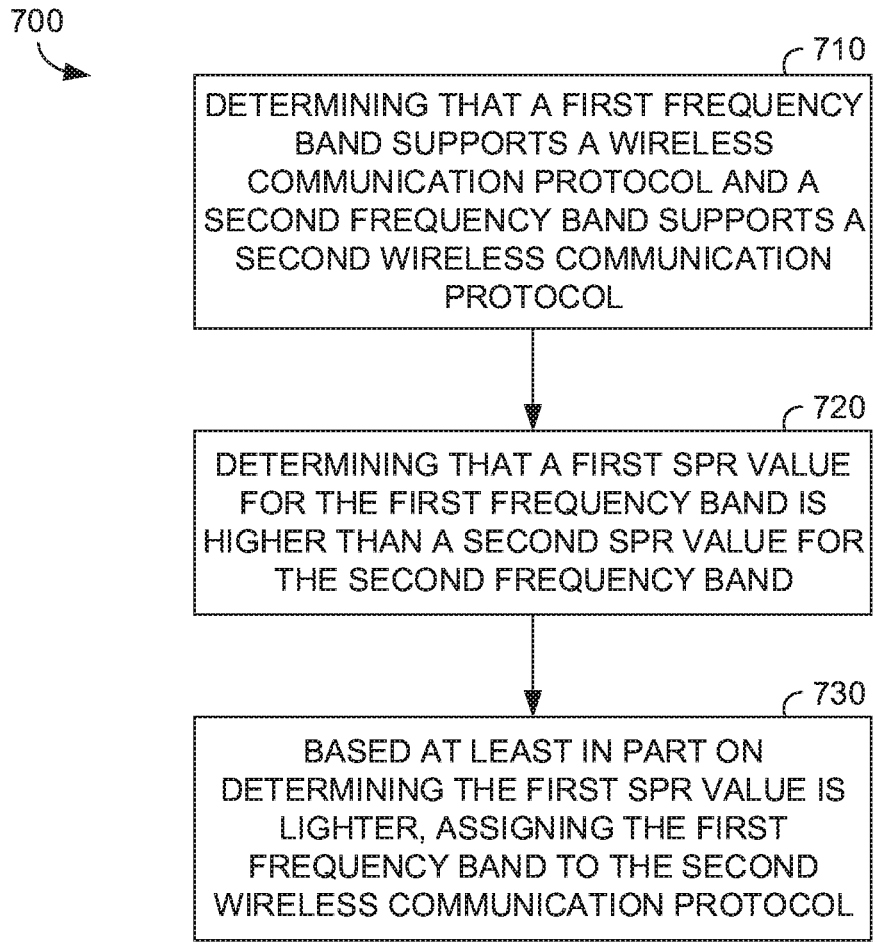
FIG. 7 depicts flow charts of systems, methods, and media for dynamic spectrum sharing, in accordance with embodiments of the present disclosure.

Turning now to FIG. 7, example flow chart 700 involves a method for using antenna SPR to determine dynamic spectrum sharing. At 710, it is determined that a first frequency band supports a wireless communication protocol and a second frequency band supports a second wireless communication protocol. In some embodiments, the first frequency band and the second frequency band have a common channel. Further, at 720, it is determined that a first SPR value for the first frequency band is higher than a second SPR value for the second frequency band. In some embodiments, the determination that the first SPR value is higher comprises use of an inter-carrier aggregation capable device located at a spillover area of the first frequency band or the second frequency band. In some embodiments, the determination that the first SPR value is higher comprises calculations of RF radiation patterns. Furthermore, at 730, based at least in part on determining the first SPR value is higher than the second SPR value for the second frequency band, the second frequency band is assigned to the first wireless communication protocol. In some embodiments, the assignment, in addition to SPR values, is also based on loading, a number of users, an amount of data in use, location information, and channel quality information.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for using antenna sector power ratio (SPR) to determine frequency allocation, the system comprising:
    one or more nodes corresponding to a cell site, each of the one or more nodes configured to wirelessly communicate with one or more user devices in a geographic service area; and
    one or more processors corresponding to the cell site, the one or more processors configured to perform operations comprising:
        rank at least a first frequency band, a second frequency band, and a third frequency band based at least in part on the SPR;
        determine that the first frequency band has a highest rank, the highest rank indicating that the first frequency band has a lowest SPR of frequency bands being ranked; and
        based on the first frequency band having the highest rank, assign the first frequency band and either the second frequency band or the third frequency band for carrier aggregation, wherein the SPR for each carrier band assigned for carrier aggregation is below a threshold.

2. The system of claim 1, further comprising:
    determine the second frequency band is ranked higher than the third frequency band; and
    assign the first frequency band and the second frequency band for carrier aggregation.

3. The system of claim 2, wherein the first frequency band and the second frequency band have a first channel and the third frequency band has a second channel.

4. The system of claim 2, wherein the first frequency band has a first channel and the second frequency band has a second channel.

5. The system of claim 1, further comprising:
    rank a fourth frequency band;
    determine the second frequency band is ranked higher than the third frequency band and the third frequency band is ranked higher than the fourth frequency band; and
    assign the first frequency band, the second frequency band, and the third frequency band for carrier aggregation.

6. The system of claim 5, wherein the first frequency band and the second frequency band have a channel different from the third frequency band.

7. The system of claim 1, wherein the rank is additionally based on loading, a number of users, and an amount of data in use.

8. One or more non-transitory computer-readable media having computer-executable instructions embodied thereon that, when executed, perform a method for using antenna sector power ratio (SPR) to determine frequency allocation, the method comprising:
- ranking, via a processor associated with a cell site, a plurality of frequency bands based at least in part on the SPR;
- determining, via the processor, a first frequency band of the plurality of frequency bands has a lower rank than a second frequency band, the lower rank indicating that the first frequency band has a higher SPR than the second frequency band; and
- based at least in part on the lower rank, assigning the second frequency band and a third frequency band of the plurality of frequency bands for carrier aggregation, wherein the SPR of the second frequency band and the third frequency band assigned for carrier aggregation are below a threshold.

9. The one or more non-transitory computer-readable media of claim 8, wherein the third frequency band has a rank equal to the second frequency band.

10. The one or more non-transitory computer-readable media of claim 8, further comprising determining the third frequency band is ranked higher than the first frequency band.

11. The one or more non-transitory computer-readable media of claim 10, further comprising:
- ranking a fourth frequency band and a fifth frequency band;
- determining the first frequency band is ranked higher than the fourth frequency band and the fifth frequency band; and
- assigning the first frequency band, the second frequency band, and the third frequency band for carrier aggregation.

12. The one or more non-transitory computer-readable media of claim 11, wherein the first frequency band, the second frequency band, and the third frequency band have a common channel.

13. The one or more non-transitory computer-readable media of claim 12, wherein the first frequency band and the second frequency band have a common carrier.

14. The one or more non-transitory computer-readable media of claim 13, wherein the first frequency band and the second frequency band have a different subcarrier.

15. A method using antenna sector power ratio (SPR) to determine frequency allocation, the method comprising:
- ranking, via a processor associated with a cell site, a plurality of frequency bands based at least in part on the SPR, the plurality of frequency bands comprising a first frequency band, a second frequency band, and a third frequency band;
- determining, via the processor, the first frequency band has a lowest rank, the lowest rank indicating that the first frequency band has a higher SPR than the second frequency band and the third frequency band; and
- based at least in part on the lowest rank, assigning the second frequency band and the third frequency band for carrier aggregation, wherein the SPR of the second frequency band and the third frequency band assigned for carrier aggregation are below a threshold.

16. The method of claim 15, further comprising:
- receiving a connection request from a user device, the user device being located within a coverage area associated with the first frequency band, the second frequency band, and the third frequency band;
- re-ranking, via the processor, the first frequency band, the second frequency band, and the third frequency band based on receiving the connection request;
- determining the second frequency band has the lowest rank based on the re-ranking; and
- assigning the first frequency band and the third frequency band for carrier aggregation for the user device.

17. The method of claim 15, further comprising:
- determining that the SPR of the second frequency band and the SPR of the third frequency band are below the threshold, the threshold based at least in part on a power supplied to a transmitting-receiving component of the cell site transmitting the second frequency band and the third frequency band; and
- assigning the second frequency band and the third frequency band for carrier aggregation based on the SPR of the second frequency band and the SPR of the third frequency band being below the threshold.

18. The method of claim 15, wherein the second frequency band and the third frequency band are assigned for intra-band carrier aggregation.

19. The method of claim 15, wherein a first antenna associated with the first frequency band has a greater spillover area compared to a second antenna associated with the second frequency band.

20. The method of claim 15, wherein the second frequency band and the third frequency band are assigned for inter-band carrier aggregation.

* * * * *